United States Patent

[11] 3,627,237

| [72] | Inventor | Hueray J. Smith |
| | | Renton, Wash. |
| [21] | Appl. No. | 797,586 |
| [22] | Filed | Feb. 7, 1969 |
| [45] | Patented | Dec. 14, 1971 |
| [73] | Assignee | Sundstrand Data Control, Inc. |
| | | Redmond, Wash. |

[54] AIRCRAFT THROTTLE CONTROL
11 Claims, 6 Drawing Figs.

[52] U.S. Cl. ................................................. 244/77 D
[51] Int. Cl. ................................................. B64c 13/18
[50] Field of Search ........................................ 244/77, 77
A, 77 D, 775, 77 DZ; 235/150.2, 150.22; 318/584, 619, 620, 635

[56] References Cited
UNITED STATES PATENTS

| 3,275,269 | 9/1966 | Yiotis | 244/77 D |
| 3,327,972 | 6/1967 | Greene | 244/77 D |
| 3,128,967 | 4/1964 | Hays, Jr. | 244/77 D |
| 3,361,394 | 1/1968 | Pfersch | 244/77 M |
| Re25,491 | 12/1963 | Lee et al. | 244/77 DZ |

FOREIGN PATENTS

| 765,697 | 8/1967 | Canada | 244/77 D |

*Primary Examiner*—Milton Buchler
*Assistant Examiner*—Jeffrey L. Forman
*Attorney*—Hofgren, Wegner, Allen, Stellman & McCord ABSTRACT: An automatic throttle control for an aircraft in which the rate of throttle movement is a function of the control signal amplitude. The control signal is modified by a signal transfer means which has a ratio of out-put to input that is a function of signal amplitude and aircraft configuration, as flap position. The control signal is a combination of an error signal and a damping signal. A bypass circuit around the signal transfer means is rendered operative if the underspeed error signal becomes excessive to apply a throttle advance signal directly to the throttle.

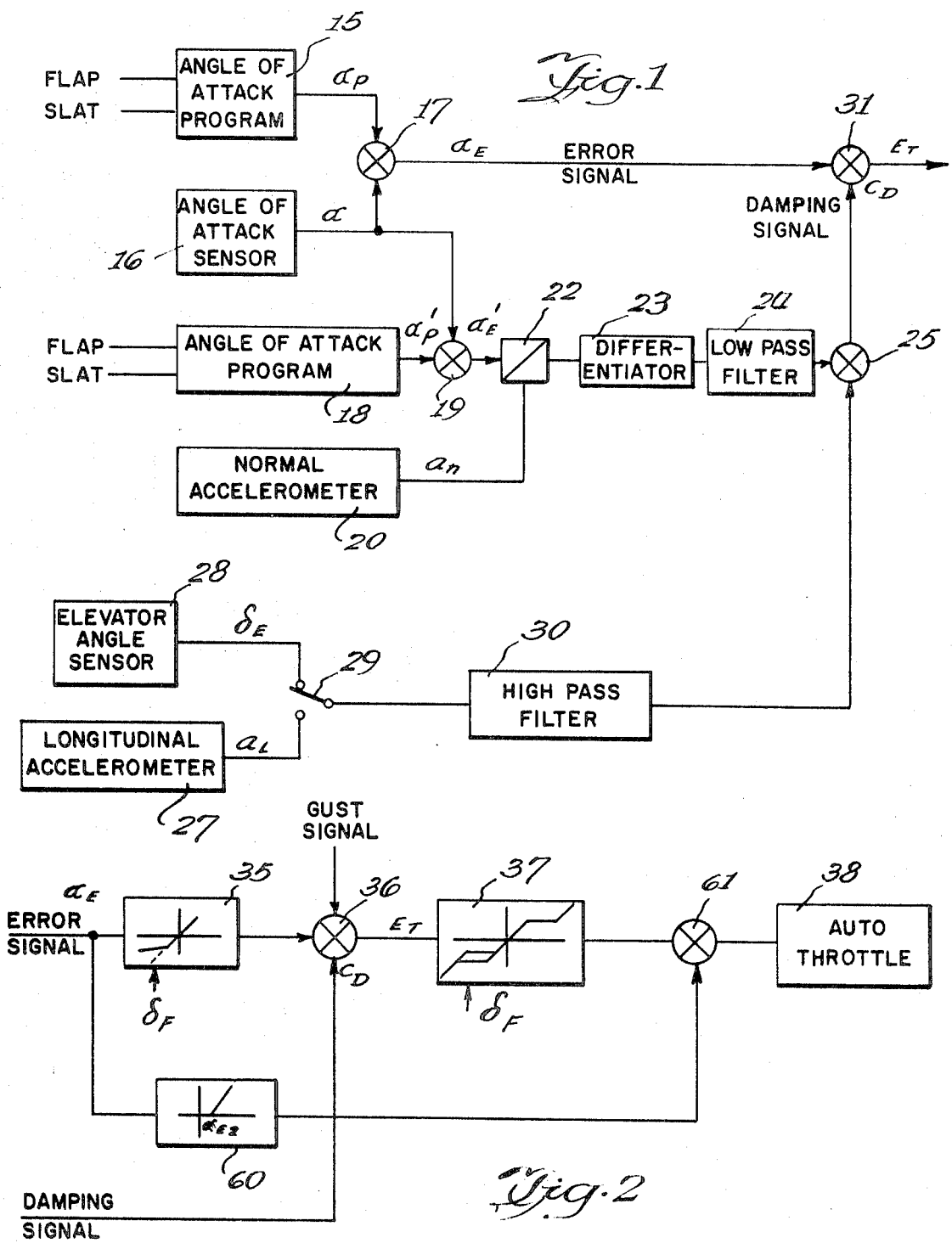

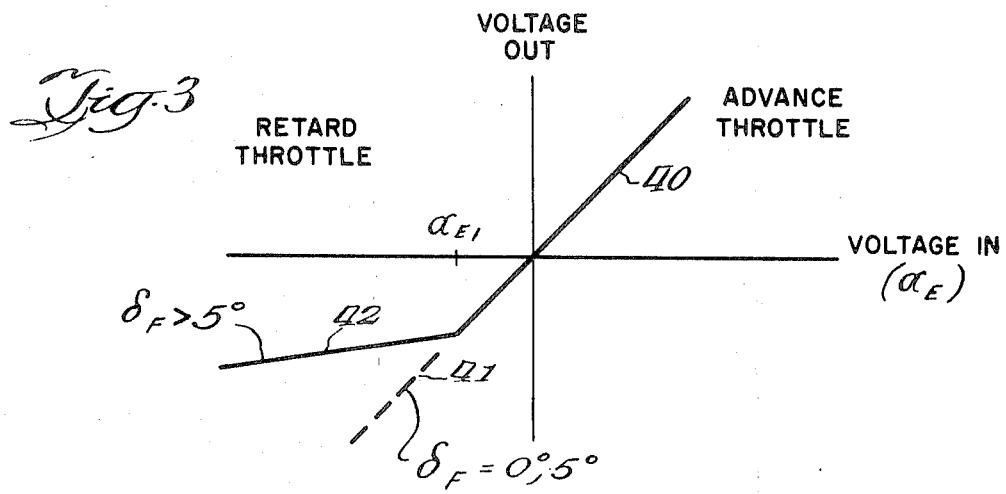
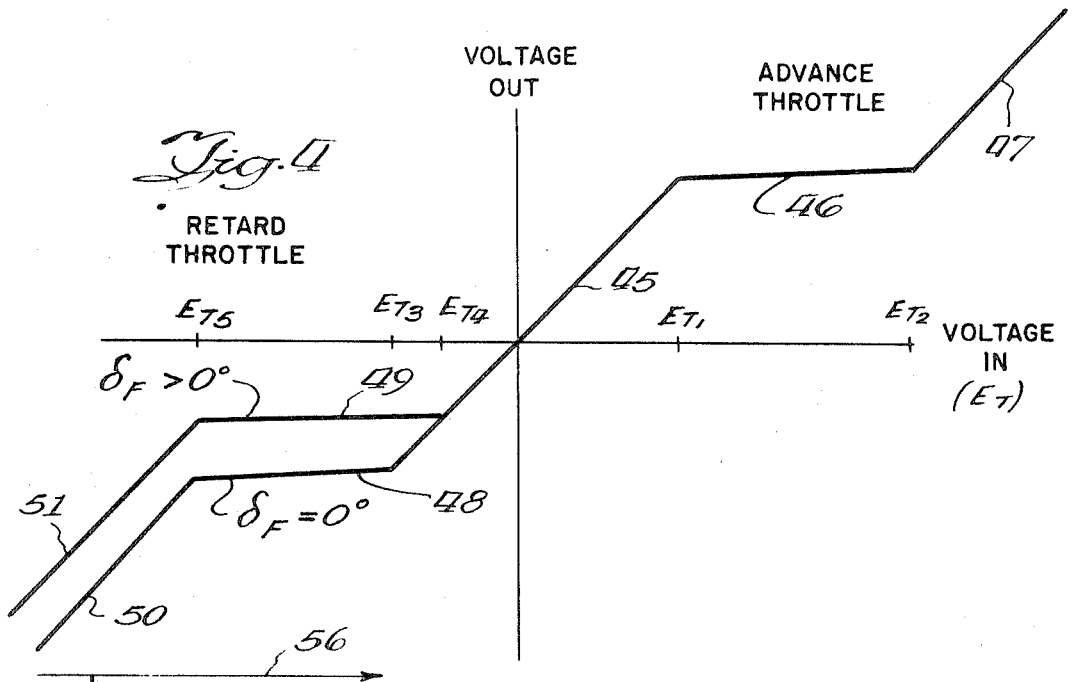
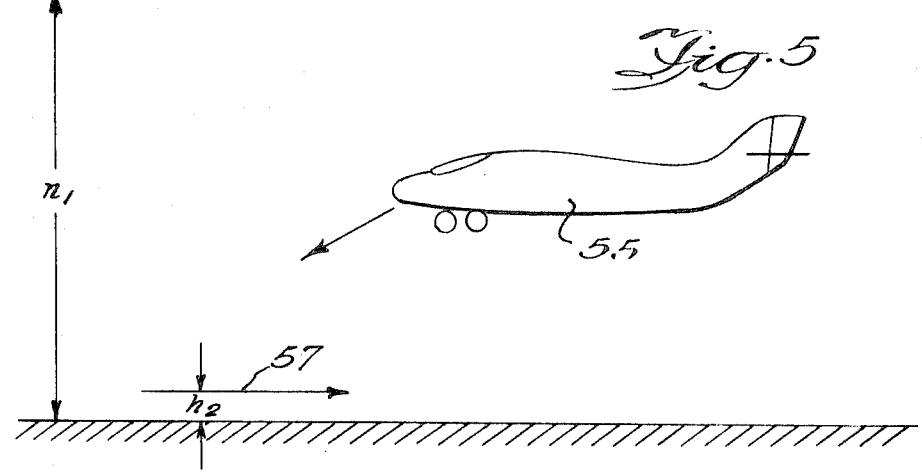

AIRCRAFT THROTTLE CONTROL

This invention is concerned with an automatic throttle control for an aircraft, and more particularly with such a control for use during the landing approach maneuver.

It is known to operate the throttle of an aircraft automatically in accordance with a control signal derived from aircraft flight conditions. Such a signal generally has two major components—one, an error signal responsive to a deviation of an aircraft flight condition from a desired or optimum condition, and the other a damping term related to aircraft dynamics which provides a rapid, nonoscillatory response. The control signal is applied to a throttle servomotor which drives the aircraft throttle at a rate which is a direct function of the signal amplitude. Such a system which has signal gain characteristics to provide rapid response with a high amplitude control signal is excessively sensitive to lower amplitude control signals. This results in a high rate of throttle activity, small rapid throttle movements, which cause the engines to speed up and slow down. This is distracting to the pilot and disconcerting to the passengers.

I have determined that this precise response to the control signal is not necessary and that the control signal can be modified to reduce throttle activity without degrading the safety and accuracy of the system.

One feature of the invention is the provision of an aircraft throttle control having a source of control signal for advancing and retarding the aircraft throttle, means for operating the throttle of the aircraft and a signal transfer means connected between the signal source and the throttle operator and including means for modifying the ratio of output to input signal to provide a desired pattern of throttle activity. More particularly, in the specific embodiment of the invention illustrated herein, the ratio of output to input signal, and thus the relationship of the throttle signal to the control signal, is modified in accordance with both the control signal amplitude and the aircraft configuration.

Another feature of the invention is that the signal transfer means has one ratio for an intermediate range of control signal amplitude and a greater ratio for both larger and smaller signals. The greater ratio for larger signals ensures rapid response when there is a substantial deviation from the desired aircraft condition. The greater ratio for small amplitude signals keeps the throttle moving when the system is substantially in balance. This avoids the static friction which would be present in the throttle mechanism if the throttle were allowed to come to rest, and contributes to rapid response.

A further feature of the invention is that if the throttle advance signal exceeds a certain value, indicating a substantial underspeed condition, a bypass circuit is activated connecting the signals directly with the throttle operator.

Further features and advantages of the invention will readily be apparent from the following specification and from the drawings, in which:

FIG. 1 is a functional block diagram of an aircraft control system which may be utilized with the invention;

FIG. 2 is a functional block diagram of an embodiment of the invention;

FIG. 3 is a curve illustrating the signal transfer characteristic of a portion of the system;

FIG. 4 is a curve illustrating the signal transfer characteristic of another portion of the system;

FIG. 5 is a diagrammatic illustration of an aircraft in the landing approach maneuver, illustrating a wind shear condition with which the control of the invention is particularly useful.

Figure 6:
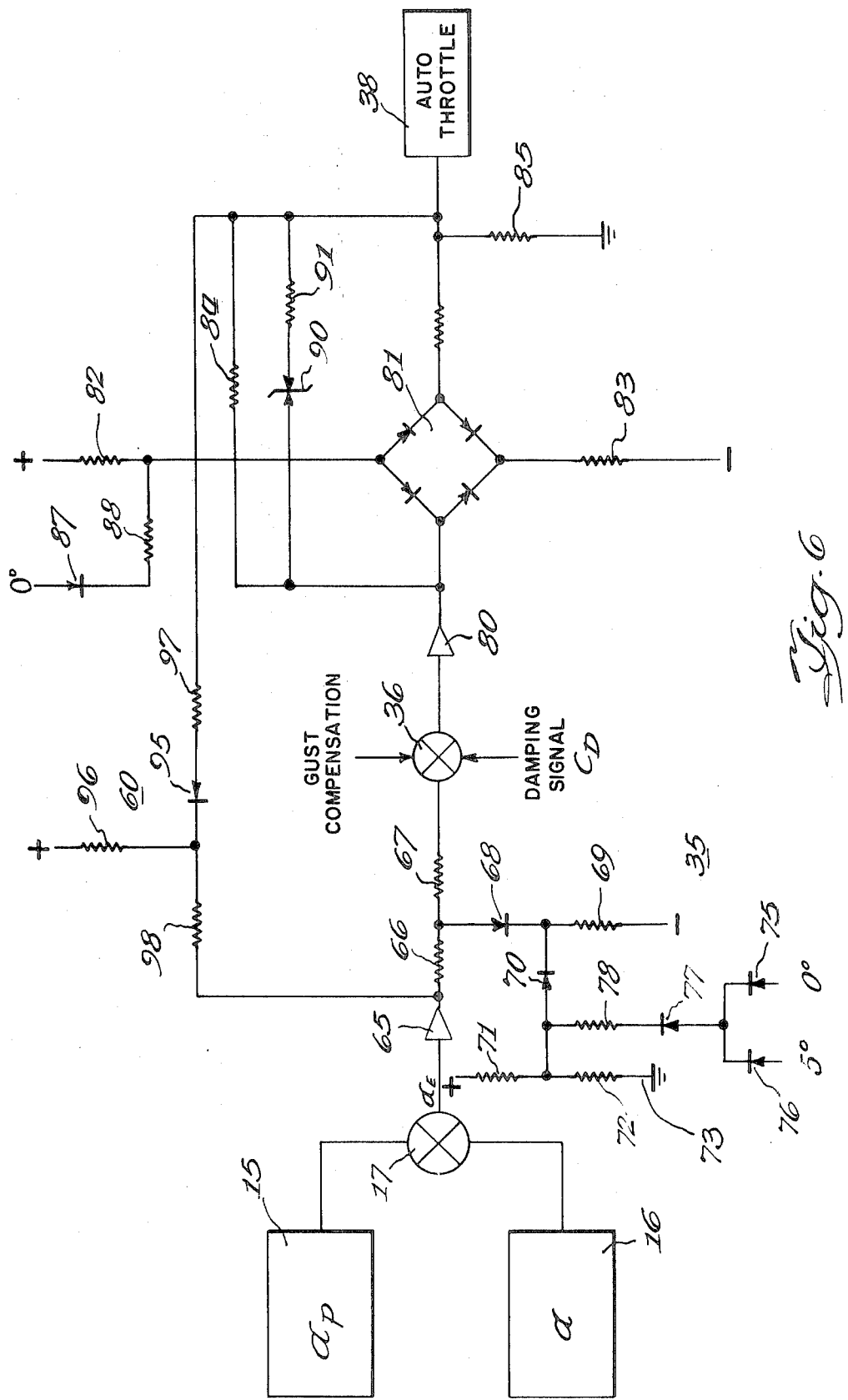
FIG. 6 is a schematic diagram of a portion of a control system illustrating an embodiment of the invention.

Various aircraft control systems have been proposed and used to provide inputs to an autothrottle system and might be utilized with the present invention. See, for example, Jude U.S. Pat. No. 2,933,268, Greene, U.S. Pat. No. 2,945,375, Joline, U.S. Pat. No. 2,948,496 and Greene, U.S. Pat. No. 3,043,540. Illustrated in FIG. 1 of the drawings is a preferred aircraft control system which is disclosed and claimed in copending McElroy U.S. application Ser. No. 788,454, filed Jan. 2, 1969, and assigned to the assignee of this invention. The system is based primarily on angle of attack information. An angle of attack program, i.e., a desired angle of attack for the aircraft, is established in accordance with the positions of the flaps and slats (if any) of the aircraft by a program generator 15. The angle of attack program, $\alpha_{pa}$, is compared with the actual angle of attack $\alpha$, from sensor 16 at summing point 17. The resulting difference or error signal provides a command for an automatic control (or for the pilot) which has the effect of changing the aircraft attitude to make the angle of attack equal the programmed value. For example, if the angle of attack is greater than the programmed value, this indicates the airspeed is slow and should be increased. Conversely, if the angle of attack is less than that programmed, the airspeed is high and should be reduced. During landing approach, the pitch attitude of the aircraft remains relatively fixed and changes in angle of attack are effected by alteration of the throttle setting to change the thrust of the engines and the aircraft speed.

A control based solely on the deviation of angle of attack from the programmed value would have a tendency to cause oscillation of the aircraft. Accordingly, a damping signal is provided which responds to dynamic characteristics of the aircraft and anticipates a balanced system condition, providing rapid response without oscillation. In accordance with the system illustrated in FIG. 1, the damping signal is blended from several inputs. Long term or low frequency damping information is obtained from a combination of angle of attack and normal acceleration. A second angle of attack program $\alpha_{p}'$ is established by program generator 18, again as a function of flap and slat positions. The angle of attack, $\alpha$, from sensor 16 is compared with $\alpha_{p}'$ at summing point 19 and an error signal $\alpha_{E}'$ obtained. Normal accelerometer 20 has an output $a_n$ which is combined with $\alpha_{E}'$ in a divider circuit 22, the output of which is $\alpha_{E}'/a_n$. This quotient signal is coupled to a differentiator circuit 23 and through a low pass filter 24 to summing point 25. Short term or high-frequency damping information may be obtained either from a longitudinal accelerometer 27 or an elevator angle sensor 28. If both are available in the aircraft, a switch 29 may be utilized to select the desired signal. The high-frequency signal is coupled through a high pass filter 30 to summing point 25 where it is combined with the low-frequency damping signal to provide a composite damping signal, $C_D$. The error signal $\alpha_E$ and the composite damping signal $C_D$ are combined at summing point 31, providing signal which may be utilized with an automatic aircraft control, as an autothrottle during landing approach, or displayed for the pilot on a slow-fast meter or a pitch director (not shown).

In accordance with the invention, the error or command signal and the damping signal are modified and combined in the manner illustrated in FIG. 2. The error signal, $\alpha_E$, is connected to a signal transfer circuit means 35 which has a signal transfer characteristic illustrated graphically in the drawing. The curve is plotted with the input signal as the abscissa and the output signal as the ordinate. The upper right-hand quadrant of the curve represents a throttle advance signal while the lower left-hand quadrant represents a throttle retard signal. The broken line characteristic curve represents the conditions for a low value of flap angle, $\delta_F$, while the solid line portion of the curve represents the conditions for higher flap angles. The modified error signal is combined with the damping signal $C_D$ at summing point 36. Other control modifying signals, as a gust signal for example, may also be introduced at this summing point. The total throttle signal, $E_T$, is connected through a second signal transfer means 37 to the autothrottle servocontrol 38.

The transfer characteristic of circuit 37 is illustrated in a manner similar to that of circuit 35 with the input signal plotted as the abscissa and the output signal as the ordinate; and with a throttle advance signal in the upper right-hand quadrant and a throttle retard signal in the lower left-hand quadrant. Briefly, the transfer circuit 37 has three regions of operation. First, small amplitude signals of either positive or negative polarity, in the vicinity of zero, are coupled through the circuit without substantial change. Second, an intermediate value of input signal, of either polarity, has a greatly reduced ratio of output to input. Third, large amplitude signals of either polarity, are coupled through the circuit with little change. The two curves in the third quadrant of the characteristic of transfer circuit 37 indicate two different operating conditions selected in accordance with the flap angle, $\delta_F$.

The autothrottle servomechanism 38 drives the throttles at a rate which is a function of the amplitude of the control signal. This is generally expressed in terms of degrees of throttle movement per second per volt. The effect of the transfer circuits which reduce the ratio of output to input signal is to limit the amplitude of signal applied to the autothrottle servomechanism for given error or control signal conditions. This in turn limits the rate of throttle movement resulting from an input signal. It doesn't eliminate throttle activity, but slows it down so that rapid movement back and forth does not occur.

The operating characteristic of the transfer circuit means 35 is illustrated in more detail in FIG. 3. For an advance throttle error signal at the input, the output varies linearly at a rate indicated by the slope of line 40. For a throttle retard signal with a flap angle, $\delta_F$, of 0° or 5° the transfer characteristic of the circuit is also linear and along the same slope, as indicated by broken line curve 41. When the flap angle, $\delta_F$, is increased beyond 5,° a portion of the throttle retard transfer characteristic is modified. For a retard input voltage in excess of $\alpha_{E_1}$, the transfer characteristic follows curve 42, with a slope substantially less than that of curve 41. Thus the sensitivity of response of the system to a retard is reduced. The speed of the engine is reduced at a slower rate than it is increased when the system calls for a throttle change.

The transfer characteristic for transfer circuit means 37 is illustrated graphically in FIG. 4 where the output voltage, which is applied to the autothrottle, is plotted as a function of the total control signal $E_T$. For small values of $E_T$, both positive and negative, the output voltage has a linear relationship indicated by curve 45. For a range of throttle advance input voltages $E_{T_1} - E_{T_2}$, the transfer characteristic is indicated by curve segment 46, with a slope less than that of curve 45. The sensitivity of response of the system to control voltages in this range is reduced. For control signals in excess of $E_{T_2}$, the transfer characteristic is indicated by curve 47, having a greater sensitivity than for control signals in the range $E_{T_1} - E_{T_2}$. The transfer circuit means 37 has two characteristics for throttle retard signals, depending on T, flap setting of the aircraft. With 0° flap, the transfer characteristic continues along curve 45 until the control signal reaches a voltage $E_{T_3}$. For negative voltages greater than $E_{T_3}$, the sensitivity of the system is reduced and the transfer characteristic follows curve 48. With a flap angle greater than 0,° the sensitivity is reduced at a lesser control voltage $E_{T_4}$, and the transfer characteristic follows curve 49. If the overspeed condition, calling for a throttle retard action, exceeds a desired value, indicated by control signal voltage $E_{T_5}$, the sensitivity of the system is again increased and the output voltage to the autothrottle follows curve 50 or 51, depending on the flap setting.

The control region between $E_{T_1}$ and $E_{T_3}$ or $E_{T_4}$ provides sensitive response to signals, either positive or negative, in the vicinity of a zero value for $E_T$. This promotes a small amplitude, high-speed movement of the throttle about its steady-state position. Continuous movement of the throttle keeps it ready to respond to any command and avoids development of static friction.

It sometimes happens that the airspeed will drop so rapidly that the system described above cannot follow the error signal and advance the throttles rapidly enough to avoid a dangerous situation. An example of a situation in which this might occur is illustrated in FIG. 5. An aircraft 55 is shown on an approach path toward a landing, with a headwind. At an altitude $h_1$, the headwind has a value indicated by the length of arrow 56. However, as the plane approaches the ground, a wind shear condition is encountered in which the velocity of the headwind decreases with altitude. At an altitude $h_2$, it has a value indicated by the length of arrow 57, substantially less than the velocity at $h_1$. This difference in headwind, which can occur quickly if the aircraft is descending rapidly, can cause the aircraft to approach stalling speed at a very low altitude.

In accordance with the invention, a bypass circuit 60, FIG. 2, is connected from the source of error signal, $\alpha_E$, to summing point 61 between the output of transfer circuit 37 and autothrottle 38. The transfer characteristic of bypass circuit 60 is illustrated graphically in the drawing. For a throttle advance signal in excess of a value $\alpha_{E_2}$, the error signal is applied directly to the autothrottle, undiminished by the damping signal $C_D$ or the transfer characteristic of circuit 37.

Illustrated in FIG. 6 is a fragmentary diagram of a control system showing schematically a circuit for providing the signal transfer characteristics discussed above. The command error signal, $\alpha_E$, from summing junction 17 is connected with an amplifier 65, the output of which is connected through resistors 66, 67 with summing junction 36. The output of amplifier 65 is positive for a throttle retard signal and negative for a throttle advance signal. The anode of diode 68 is connected between the junction of resistors 66 and 67, through resistor 69 with a source of negative potential. Diode 70 has its cathode connected with the junction between diode 68 and resistor 69, and its anode connected to the midpoint of a voltage divider, resistors 71, 72, from a positive voltage source to ground 73.

Considering first the situation with greater than 5° of flap, diode 70 conducts and through the action of the voltage divider made up of resistors 71, 72 and 69, applies a positive voltage to the cathode of diode 68, rendering it nonconductive. Throttle advance signals at the output of amplifier 65 are negative in sign and are unaffected by the signal transfer network 35. Throttle retard signals are positive. When the positive signal voltage exceeds the bias on the cathode of diode 68 ($\alpha_{E_1}$, FIG. 3), resistor 69 is shunted across the signal path. The signal then coupled through a resistor 67 to summing point 36 is determined by the relative value of resistors 66 and 69. This establishes the slope of transfer characteristic curve 42, FIG. 3.

With conditions of 0° or 5° flap, a positive voltage is applied to anode of diode 75 or 76, respectively. This positive voltage is coupled through diode 77, resistor 78 and diode 70 to the cathode of diode 68, rendering it nonconductive. For this flap setting the slope of the transfer curve 41 is the same as that for a throttle advance signal.

The total throttle signal, $E_T$, from summing point 36 is connected to amplifier 80 which has a diode bridge network 81 connected between its output and the input of autothrottle servomechanism 38. The diode network is connected through resistors 82, 83 across a voltage supply which renders the four diodes conductive. The current level through the diodes is determined by the value of resistors 82, 83, and the voltage to which they are connected.

So long as the signal $E_T$ produces a current less than the diode current, it passes unchanged to autothrottle 38. However, when the signal current exceeds the diode current ($E_{T_2}$, FIG. 4), one pair or the other of the diodes is back biased, interrupting the signal to the autothrottle. Resistor 84 is connected in parallel with the diode bridge and bypasses a portion of the signal to the autothrottle. When the bridge is cut off, the relative values of resistor 84 and resistor 85 to ground determine the slope of curve segments 48 and 49, FIG. 4.

With a condition of zero flaps, a positive voltage is applied to diode 87, connected through resistor 88 with the diode bridge. This increases the level of current flow through the bridge and thus establishes the signal value $E_{T_3}$ at which the diode bridge blocks.

Connected in parallel with the diode bridge 81 and bypass resistor 84 is a network including back to back Zener diodes 90 and resistor 91. If the total throttle signal $E_T$ exceeds the breakdown voltage of the Zener diodes, they conduct, bypassing an additional signal to the autothrottle 38. This corresponds with the voltages $E_{T_2}$ and $E_{T_3}$, providing transfer characteristic curve portions 47, 50 and 51.

The $\alpha_E$ override circuit 60 includes a diode 95 back biased by a positive voltage applied through resistors 96, 97 and 85. When a negative signal at the output of amplifier 65 exceeds the diode bias (as $\alpha_{E_2}$, FIG. 2), the diode conducts and the error signal is applied directly (through resistors 97 and 98) to the autothrottle.

The throttle control system has been described as operating a single throttle to control a single engine of an aircraft. Of course, where used on a multiengine plane, the system can be used to control all of the throttles in unison.

I claim:

1. A throttle control system for an aircraft having a servo drive for advancing and retarding the throttle, the rate of throttle movement being a function of the amplitude of the control signal, comprising:
    means for generating a throttle control signal for advancing and retarding the throttle, based on a flight characteristic of the aircraft, including a source of programed flight characteristic signal, a source of actual flight characteristic signal, a source of dynamic damping signal and means for combining the programmed and actual flight characteristic signals and the damping signal to provide said throttle control signal;
    a signal transfer means with an input connected to said combining means and to an output, said signal transfer means having a ratio of output to input signal which is a function of the amplitude of the input signal; and
    means utilizing the signal from the output of said transfer means for controlling the throttle of said aircraft, the rate of throttle movement being a function of the amplitude of the output signal of said signal transfer means.

2. The throttle control of claim 1 in which the signal transfer means has a ratio of output to input signal for input signals in a range of amplitudes, which is less than the ratio for larger amplitude input signals.

3. The throttle control of claim 1 in which the signal transfer means has a ratio of output to input signal for input signals of small amplitude of either positive or negative polarity, which ratio is greater than the ratio for input signals of larger amplitude.

4. The throttle control of claim 1 in which the signal transfer means has three regions of operation, the first with an input signal of small amplitude of either positive or negative polarity, the second with an intermediate amplitude input signal and the third with an input signal in excess of the intermediate amplitude, the ratio of output to input signal of the transfer means for the second region being less than the ratio for the first and third regions of operation.

5. The throttle control system of claim 1 in which said signal transfer means has first and second ratios of output to input signals for signals of both positive and negative polarity.

6. The throttle control system of claim 1 in which the amplitude of the input signal which determines the ratio of output to input signal is a function of an aircraft characteristic.

7. The throttle control system of claim 6 in which said aircraft characteristic is the flap position.

8. The throttle control system of claim 1 in which said signal transfer means has first and second ratios of output to input signals for both advance and retard signals and in which the amplitude of input signal that determines the ratio for a retard signal, is a function of the aircraft flap angle.

9. A throttle control system for an aircraft, comprising:
    a source of control signal for advancing and retarding the aircraft throttle;
    a signal transfer means for modifying said signals to limit throttle activity;
    means for utilizing the modified signals to advance and retard the throttles, the rate of throttle movement being a function of the signal amplitude; and
    means responsive to a throttle advance signal in excess of a predetermined level for bypassing said signal transfer means and applying said throttle advance signal directly to said throttle control.

10. The throttle control system of claim 9 in which said signal transfer means has a ratio of output to input of less than one.

11. The throttle control system of claim 9 in which said source of control signal includes a source of error signal, a source of damping signal, means for combining the two to provide a composite control signal, in which said signal transfer means modifies the composite control signal and said bypass means is operative in response to the amplitude of the error signal to apply the error signal directly to said throttle control.

* * * * *